Figure 1:
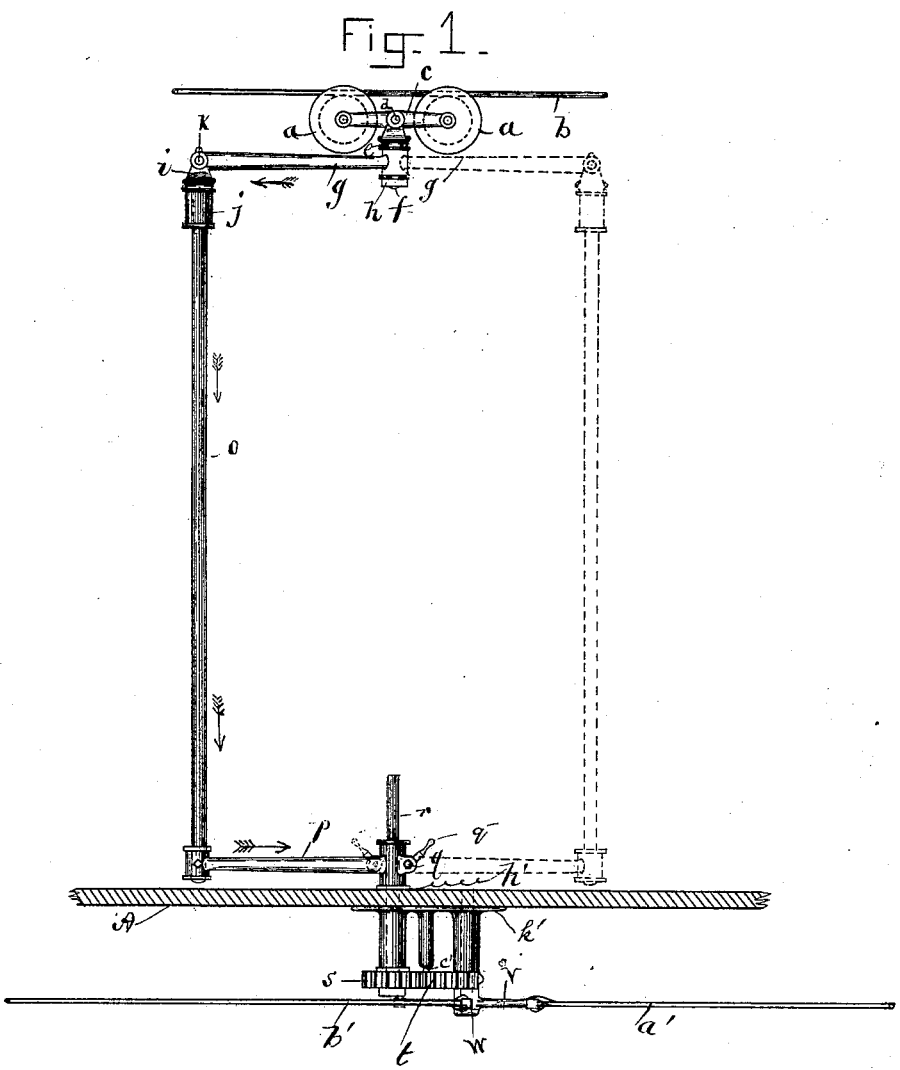

(No Model.) 3 Sheets—Sheet 1.

J. A. DUGGAN.
UPWARD PRESSURE CONTACT FOR ELECTRIC RAILWAYS.

No. 435,559. Patented Sept. 2, 1890.

WITNESSES:

INVENTOR:
John A. Duggan
by Chas. Hedrew
Attorney.

(No Model.) 3 Sheets—Sheet 2.
J. A. DUGGAN.
UPWARD PRESSURE CONTACT FOR ELECTRIC RAILWAYS.
No. 435,559. Patented Sept. 2, 1890.
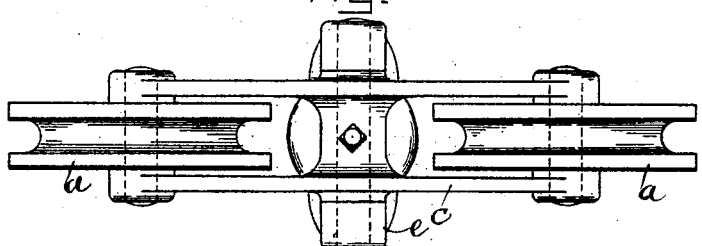
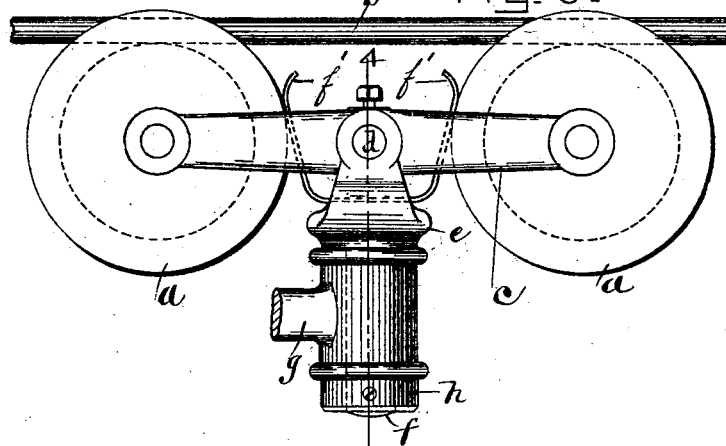
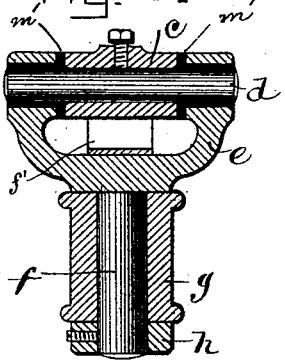
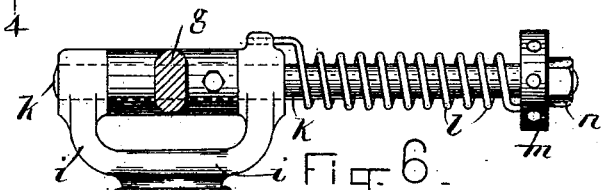
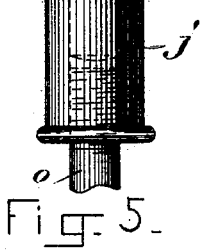
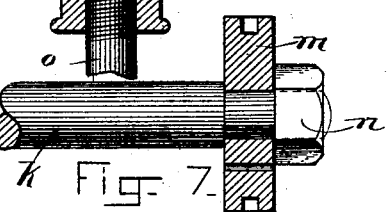
WITNESSES:
Anson M. Lyman
Marland C. Hoser
INVENTOR:
John A. Duggan
by Chas. H. Drew
Attorney.

(No Model.)
3 Sheets—Sheet 3.
J. A. DUGGAN.
UPWARD PRESSURE CONTACT FOR ELECTRIC RAILWAYS.
No. 435,559.  Patented Sept. 2, 1890.
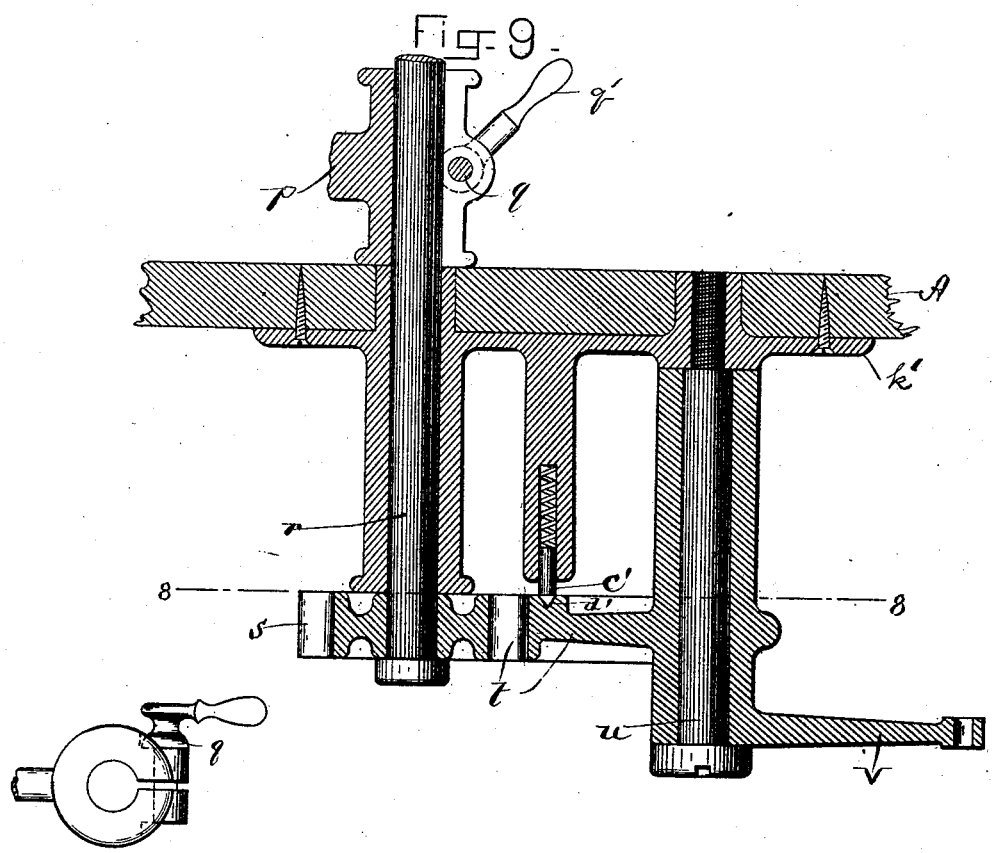
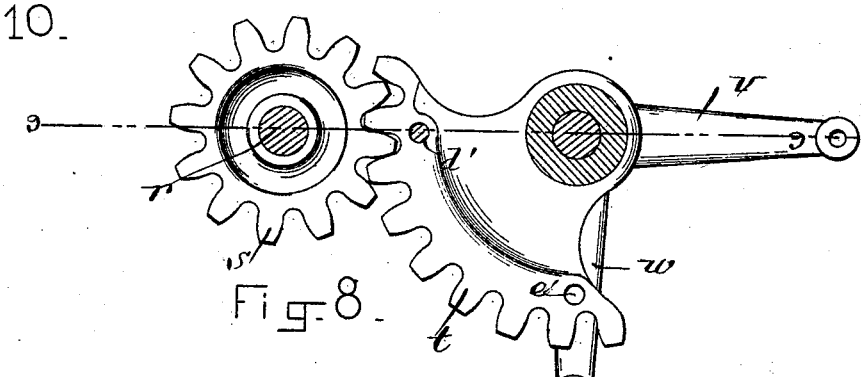
WITNESSES:
Anson M. Lyman
Marland C. Hosley
INVENTOR:
John A. Duggan
by Chas. H. Drew
Attorney.
THE NORRIS PETERS CO., PHOTO-LITHO., WASHINGTON, D. C.

UNITED STATES PATENT OFFICE.

JOHN A. DUGGAN, OF QUINCY, MASSACHUSETTS, ASSIGNOR TO THE BURNHAM & DUGGAN RAILWAY APPLIANCE COMPANY.

UPWARD-PRESSURE CONTACT FOR ELECTRIC RAILWAYS.

SPECIFICATION forming part of Letters Patent No. 435,559, dated September 2, 1890.

Application filed December 13, 1888. Serial No. 293,655. (No model.)

*To all whom it may concern:*

Be it known that I, JOHN A. DUGGAN, of Quincy, in the county of Norfolk and State of Massachusetts, have invented certain new and useful Improvements in Means for Upward-Pressure Contact for Electric Railways; and I do hereby declare that the following is a full, clear, and exact description of the invention, which will enable others skilled in the art to which it appertains to make and use the same.

The object of my invention is a trolley or wheel for conducting an electric current from an overhead wire or cable to the motor of a vehicle to be propelled by electricity, means for supporting the trolley so that it shall adapt itself to the variation of the position of the vehicle with reference to the wire or cable, and a reversing mechanism whereby the arm supporting the trolley may be readily reversed.

In the drawings I have shown, in Figure 1, a side elevation of my invention with a section of a portion of the top of the vehicle to which it is to be attached; in Fig. 2, a plan of the trolley on an enlarged scale; in Fig. 3, a side elevation of the same and of the equalizing-lever and its fulcrum; in Fig. 4, a section on line 4 4, Fig. 3; in Fig. 5, a side elevation showing the method of attaching the swiveled arm $g$ to the rod $o$; in Fig. 6, a front elevation of Fig. 5; in Fig. 7, an enlarged detail of mechanism for adjusting the spring 1; in Fig. 8, an enlarged plan view of the reversing mechanism on the line 8 8, Fig. 9; in Fig. 9, an enlarged sectional elevation on line 9 9 in Fig. 8; and in Fig. 10, a plan of a portion of Fig. 9.

I intend to make use of two wheels or trolleys $a$ $a$, which are grooved upon their peripheries so as to partially encircle the electric wire or cable $b$, and they have bearings on the ends of an equalizing bar or lever $c$, attached by the bolt $d$, on which it has an up-and-down movement, to the arm $e$. The arm $e$ is attached to or in one piece with the pin $f$, which fits into a socket on the end of the arm $g$ and turns freely in this socket, and is secured thereto by the collar $h$. The arm $g$ is secured by a set-screw to a shaft $k$, which turns in bearings in the piece $i$, and is prolonged beyond said piece $i$ at one side and provided with a torsion-spring $l$, fastened at one end to the piece $i$ and at the other end to the collar $m$, and by means of the nut $n$ means are provided whereby the tension of the spring upon the lever $g$ may be regulated. Reference may be had to Fig. 6, where these features are particularly shown. The piece $i$ turns freely in the collar $j$, which is a part of or is secured to the standard $o$. The standard $o$ is fastened to the end of an arm $p$. The arm $p$ is gripped by the bolt $q$ to the shaft $r$ by means of the handle $q'$. The shaft $r$ is fastened at its lower end to a gear $s$, which is actuated by the segment $t$. The segment $t$ has a bearing on the stud $u$, fastened to a plate $k'$, secured to the roof of the car A. The segment $t$ is provided with two arms $v$ and $w$, which are actuated by cords $a'$ $b'$, one running to each platform of the car. A spring-pin $c$ locks the segment $t$ in place by springing into the holes $d'$ or $e'$ when they are brought under the pin by pulling upon the arms $v$ or $w$ by means of the cord $a'$ or cord $b'$. The spring $f'$, Fig. 3, forms a connection by means of which the electricity is conducted from the trolleys to the arm $e$, and thence by the several connections $g, i, j, o$, and $p$, above described, to the wire $h'$, and thence by said wire to a motor beneath the car. The lever $c$ and shaft $d$ are insulated from the fulcrum $e$, as shown in Fig. 4, by the non-conducting bushings $m'$ $m'$. If there should be any slight inequalities in the cable, they will be compensated for by the lever $c$ turning upon its bearings, by means of which lever the pressure is at all times equal. Any large variation in the vertical distance of the cable from the top of the car will be compensated for by the lever $g$, which, if the height of the cable from the top of the car should decrease, will be pushed down, turning the shaft $k$ and overcoming the resistance of the spring $l$; but if the height of the cable from the top of the car should increase the lever $g$ will be elevated so as to keep the trolleys against the cable by the action of the spring $l$. Any motion of the car to one side or the other of the cable will be compensated for by the fulcrum $e$, which will turn on its bearing $f$, and by the piece $i$, which will turn in the collar $j$, thus securing a parallel motion, so that the trolleys will be free to travel in line with the cable or wire while the car moves to one side or the other of it. The height of the trolleys above the car is adjusted by moving the arm *p* up or down upon the shaft *r* and upon the standard *o*, the arm *p* being secured by bolts and screws after having been moved to the desired distance. It will be seen by the use of my invention that the trolleys being the medium of the transmission of the electric current, the current will be constant, and that when the direction in which the vehicle travels is changed there will be no interruption or disturbance of the current. If the vehicle is lighted by electricity, the lamps will not be extinguished, because of the fact that the current is constant, whereas in the case of the trolleys now in use, when the direction of the vehicle or car to which they are attached is changed, the current being interrupted, the lamps will be extinguished.

What I claim, and desire to secure by Letters Patent, is—

1. In a vehicle to be propelled by electricity, the combination of a suitable electric motor, means for maintaining continuous contact with an overhead cable or wire conveying an electric current, consisting of two trolleys connected by an equalizing-bar and acting by upward-pressure contact on the cable or wire, and means for connecting said trolleys with the said motor, substantially as and for the purposes above described.

2. The combination of an overhead wire or cable for conveying an electric current with the trolleys *a a*, arranged to be borne upward to bear against the under side of the cable or wire, and the equalizing-lever C, substantially as and for the purpose above described.

3. The combination of trolleys *a a*, the fulcrum *e*, the lever *g*, shaft *k*, spring *l*, piece *i*, standard *o*, arm *p*, and shaft *r*, substantially as and for the purpose above described.

4. The combination of the arms *v* and *w*, gear *s*, segment *t*, arm *p*, standard *o*, lever *g*, lever *c*, fulcrum *e*, and trolleys *a*, substantially as and for the purpose above described.

5. The combination of the shaft or standard *r*, bolt *q*, handle *q'*, loose arm *p*, arranged to be gripped by said bolt to said shaft, standard *o*, and the intermediate devices connecting the same to the lever-arm *c* and its trolleys *a*, substantially as and for the purpose above described.

6. The combination of the trolleys *a a* with the device for keeping them constantly in a vertical position, consisting of the lever *c*, the bolt *d*, the arm *l*, the pin *f*, the arm *g*, provided with a socket into which the pin *f* fits, the rod *o*, and arm *p*, substantially as and for the purpose above described.

7. As an attachment for a vehicle propelled by electricity, the arms *g* and *p*, united by the standard *o* and so arranged that they may readily reverse, and the rod *r* always be immediately under the bolt *d*, on which the trolleys *a a* are pivoted, substantially as and for the purpose above described.

8. In a vehicle or car to be propelled by electricity, the trolleys *a a*, the bars *c*, and arm *e*, provided with insulated bearings *m' m'*, substantially as and for the purpose above described.

9. As an attachment for a vehicle to be propelled by electricity, the trolleys *a a* on lever-bar *c*, combined with spring *f*, acting on both these trolleys, and electrical connectors from the spring to the electric motor, substantially as and for the purpose described.

10. The combination of the segment *t*, provided with the holes *d'* and *e'*, the spring *c'*, gear *s*, standard *r*, arm *p*, and the intermediate devices, as described, connecting the same to the lever-arm *c* and its trolleys *a*, substantially as and for the purpose above described.

JOHN A. DUGGAN.

Witnesses:
  BESSIE C. JONES,
  CHAS. H. DREW.